United States Patent
Yang et al.

(10) Patent No.: US 11,466,889 B2
(45) Date of Patent: Oct. 11, 2022

(54) MOTOR CONTROLLER FOR ELECTRIC BLOWERS

(71) Applicant: Regal Beloit America, Inc., Beloit, WI (US)

(72) Inventors: Bin Yang, Fort Wayne, IN (US); Brian L. Beifus, Fort Wayne, IN (US); Roger C. Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 201 days.

(21) Appl. No.: 16/813,299

(22) Filed: Mar. 9, 2020

(65) Prior Publication Data

US 2021/0278103 A1   Sep. 9, 2021

(51) Int. Cl.
*F24F 11/75* (2018.01)
*F24F 11/64* (2018.01)
*F24F 11/88* (2018.01)
*H02K 7/14* (2006.01)

(52) U.S. Cl.
CPC ............. *F24F 11/75* (2018.01); *F24F 11/64* (2018.01); *F24F 11/88* (2018.01); *H02K 7/14* (2013.01)

(58) Field of Classification Search
CPC ............. F24F 11/75; F24F 11/64; F24F 11/88
See application file for complete search history.

(56) References Cited

U.S. PATENT DOCUMENTS

| | | | |
|---|---|---|---|
| 5,736,823 A | 4/1998 | Nordby et al. | |
| 7,567,049 B2 | 7/2009 | Shahi et al. | |
| 9,625,172 B2 | 4/2017 | Sasaki | |
| 9,631,830 B2 | 4/2017 | Sasaki | |
| 9,732,976 B2 | 8/2017 | Wang et al. | |
| 2004/0219875 A1* | 11/2004 | Mills | F24F 11/30 454/256 |
| 2010/0256821 A1* | 10/2010 | Jeung | G05B 15/02 318/504 |
| 2014/0133999 A1* | 5/2014 | Hu | F04D 27/004 417/44.1 |
| 2017/0038089 A1* | 2/2017 | Wang | F24F 11/75 |
| 2020/0141606 A1* | 5/2020 | Tournier | F24F 3/044 |
| 2020/0217548 A1* | 7/2020 | Yang | F04D 15/0066 |

* cited by examiner

*Primary Examiner* — Nelson J Nieves
(74) *Attorney, Agent, or Firm* — Armstrong Teasdale LLP

(57) ABSTRACT

An electric blower system is described. The blower system includes a blower, an airflow system, a sensor, and an electric motor. The electric motor includes a motor controller. The motor controller is configured to operate the motor at a first torque and a first speed to generate a first airflow, determine a first airflow value wherein the first airflow value, the first torque, and the first speed define a first benchmark data point. The motor controller is also configured to operate the motor at a second torque and a second speed to generate a second airflow and determine a second airflow value wherein the second airflow value, the second torque, and the second speed define a second benchmark data point. The motor controller is further configured to generate an operating profile for the blower system defining torque, speed, and airflow points for different system resistances.

7 Claims, 4 Drawing Sheets

MOTOR CONTROLLER FOR ELECTRIC BLOWERS

BACKGROUND

The field of the disclosure relates generally to a motor controller for an electric motor and, more specifically, a motor controller that enables constant airflow in an electric blower system.

Electric motors are typically torque-calibrated when manufactured to ensure the torque output at the drive shaft of the electric motor matches the torque commanded. At least some electric motors, particularly electric motors driving blowers, are further calibrated to produce a constant airflow during operation in either a torque-control mode or a speed-control mode. Such a calibration quantizes airflow output for a given speed and torque output when driving the blower. The actual airflow output can vary according to the blower construction, duct or other airflow restriction into which the airflow is directed. However, calibrating electric motors for producing a constant airflow output can be a time-consuming and labor-intensive process, requiring the use and calibration of expensive and sophisticated equipment. Accordingly, improvements are desired for systems and methods for achieving a constant airflow volume rate.

BRIEF DESCRIPTION

In one aspect, an electric blower system is described. The electric blower system includes a blower, an airflow system defining a variable system resistance, a sensor coupled to the airflow system and configured to measure an airflow through the airflow system, and an electric motor coupled to the blower. The electric motor is configured to turn the blower to generate the airflow through the airflow system, and includes a motor controller. The motor controller is configured to operate the motor at a first torque and a first speed to generate a first airflow, determine, based on measurements received from the sensor, a first airflow value corresponding to the first speed and the first torque of the electric motor and a first system resistance wherein the first airflow value, the first torque, and the first speed define a first benchmark data point. The motor controller is also configured to operate the motor at a second torque and a second speed to generate a second airflow and determine, based on measurements received from the sensor, a second airflow value corresponding to the second speed and the second torque of the electric motor and a second system resistance wherein the second airflow value, the second torque, and the second speed define a second benchmark data point. The motor controller is further configured to generate, from at least the first and second benchmark data points, an operating profile for the blower system defining torque, speed, and airflow points for different system resistances.

In another aspect, a method for calibrating a blower system is described. The method includes operating an electric motor to turn a blower to generate an airflow into an airflow system defining a first system resistance and determining a first benchmark data point, indicating a first torque and first speed, corresponding to the first system resistance wherein a first airflow-to-speed ratio is constant for the first system resistance. The method also includes adjusting the first system resistance to a second system resistance and determining a second benchmark data point, indicating a second torque and a second speed, corresponding to the second system resistance wherein a second airflow-to-speed ratio is constant for the second system resistance. The method further includes generating, from at least the first and second benchmark data points, an operating profile defining torque, speed, and airflow points for different system resistances.

In yet another aspect, an airflow system is described. The constant airflow system includes a motor coupled to a blower configured to generate an airflow and a motor controller coupled to the motor. The motor controller is configured to receive a first airflow demand and operate the motor at a first speed and a first torque to generate a first airflow. The motor controller is also configured to determine a first airflow-to-speed ratio based on the first speed and the first airflow and detect a change in torque or speed corresponding to a change in system resistance. The motor controller is further configured to determine a second airflow-to-speed ratio based on the changed torque or speed and determine at least one of a second speed and second torque based on the second airflow-to-speed ratio to generate the first airflow for the changed system resistance.

DETAILED DESCRIPTION

Figure 1:
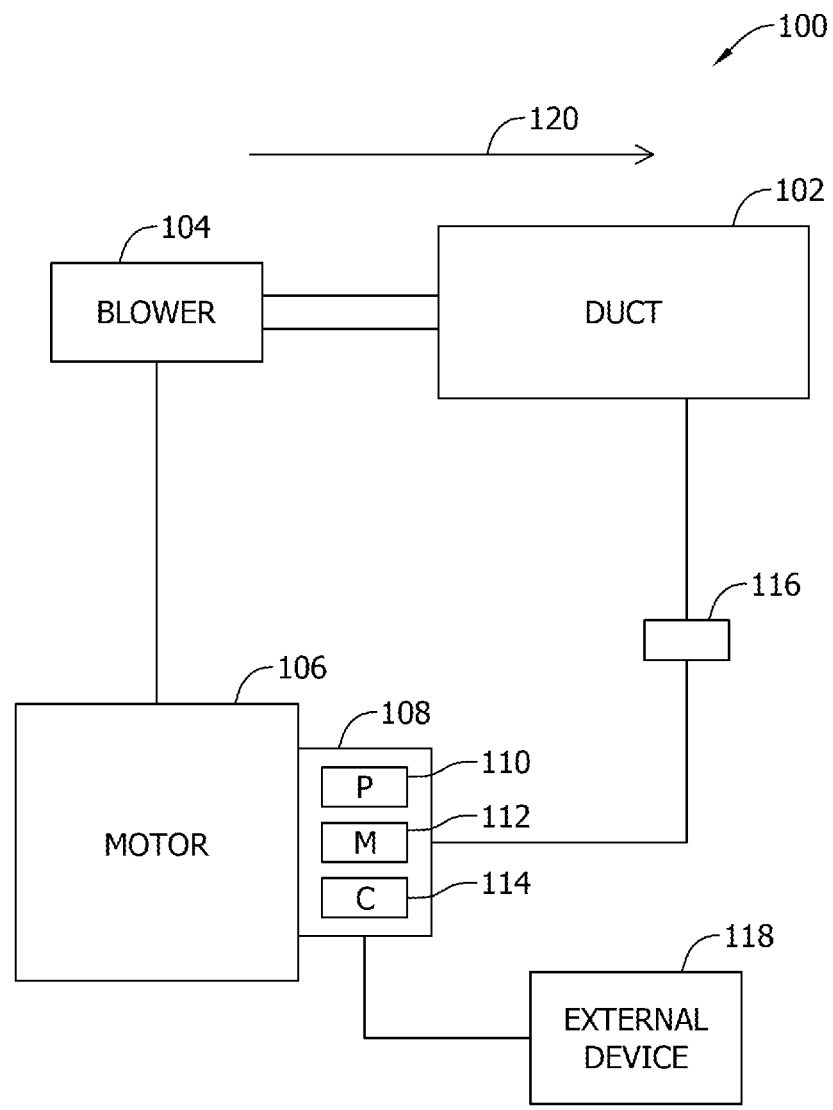
FIG. 1 is block diagram of an exemplary blower system.

Embodiments of the motor controller and methods of operating an electric motor described herein provide an improved and more efficient calibration of an electric motor based on motor torque, motor speed, and airflow.

At least some known motor controllers are configured to calibrate motors using numerous calibration points (i.e., speed-torque-airflow data points) to map the speed-torque-airflow relationship over a wide operating profile. However, these motor controllers generally require a relatively high minimum number of calibration points (e.g., 7 or 9 calibration points) to calibrate motors. Collecting this high number of calibration points can take hours, even days, due to actions required to collect the calibration points such as re-configuring expensive, sophisticated airflow measurement systems. Consequently, collecting this plurality of calibration points is time-consuming, labor-intensive, and may still be susceptible to error due to various sources of error associated with torque. Accordingly, embodiments of the systems and methods described herein require a minimum of only two calibration points, that can be generated without using the expensive, sophisticated equipment described above, thereby reducing the amount of time, cost, and labor required to calibrate, or "characterize," a system.

Changes in airflow are generally directly proportional to changes in blower speed, given that other system properties, such as airflow restriction, remain constant. Consequently, at least a portion of the motor speed-airflow relationship is substantially linear. As used herein, an airflow restriction or resistance is a set of parameters (e.g., duct size, duct geometry, etc.) that defines the airflow output of the blower.

Embodiments of the motor controller and methods of operating an electric blower motor for a constant airflow system described herein provide improvements in the characterization process for electric blower motors based on motor torque, motor speed, and airflow by requiring only two torque-speed-airflow data points (or "benchmark" data points) that can be measured in relatively simple systems. In a torque-controlled implementation, for example, the characterization embodied in the motor controller and methods described herein produces at least two torque-speed-airflow data points for the constant airflow system. An operating profile for the constant airflow system is then approximated by a polynomial, airflow algorithm, or formula, that defines motor torque (T) as a function of motor speed (N) and airflow rate demand (Q). Likewise, in a speed-controlled implementation, for example, the characterization embodied in the motor controller and methods described herein again produces at least two torque-speed-airflow data points for the constant airflow system. An operating profile for the constant airflow system is then approximated by a polynomial, airflow algorithm, or formula, that defines motor speed (N) as a function of motor torque (T) and airflow rate demand (Q). The characterization described herein yields values for various coefficients that scale the various algebraic terms of the polynomial. The polynomial is sometimes referred to as a constant airflow algorithm. However, it is generally understood the actual airflow produced by such a constant airflow system using a constant airflow algorithm only approximates the demanded airflow due to numerous sources of error and variabilities in environmental and physical properties of the constant airflow system and the duct into which the airflow is directed.

Prior to field operation of the motor controller described below, the motor controller receives values for constants that result from an analysis of characterization/calibration data for the electric motor and blower. In some embodiments, the characterization/calibration data may be generated during field operation of the motor and motor controller. The constants correspond to programmable variables within a selected constant airflow algorithm stored in memory on the motor controller and executable by a processor during operation. In certain embodiments, certain other constants for the constant airflow algorithm, or alternative constant airflow algorithms, may be defined and stored, for example, in a non-volatile memory such as an EEPROM. In certain embodiments, the values for constants may be received from an external device (e.g., an external system controller or other device), such as a user computing device, over a wired or wireless communication channel. In some embodiments, the values for the constants may be programmed into the motor controller by a technician or installer when the motor controller is installed.

During field operation, the motor controller operates at a first airflow, and detects a change in one of motor torque (T) and motor speed (N) measured at the motor. The change in one of motor torque (T) and motor speed (N) causes a change in airflow. A constant airflow is desired, thus the other of motor torque (T) and motor speed (N) is changed to once again achieve the first airflow in the duct. In one example of a torque-controlled embodiment, an airflow rate demand (Q) is stored in the memory of the motor controller, and the motor controller computes a motor torque (T) to be commanded of the electric blower motor based on a measured motor speed (N). Motor speed (N) may be determined by, for example, a measurement from a sensor. In other embodiments, motor speed (N) may be determined by the motor controller based on a different measured or otherwise determined value (e.g., a current supplied to the motor). The motor controller may then detect a change in motor speed (N) resulting from, for example, the resistance in the duct changing. Accordingly, the motor controller is configured to change motor torque (T) in order for the motor to produce the first airflow (i.e., keeping the airflow constant).

Likewise, in a speed-controlled embodiment, an airflow rate demand (Q) is stored in the memory of the motor controller, and the motor controller computes a motor speed (N) to be commanded of the electric blower motor based on a measured motor torque (T). As described above with respect to motor speed (N), motor torque (T) may be determined from the current signal supplied to the stator windings or, alternatively, may be measured directly by a sensor. The motor controller may then detect a change in motor torque (T) resulting from, for example, the resistance in the duct changing. Accordingly, the motor controller is configured to change motor speed (N) in order for the motor to produce the first airflow (i.e., keeping the airflow constant).

FIG. 1 is block diagram of an exemplary blower system 100. System 100 includes a duct 102, a blower 104, a motor 106, a motor controller 108, including a processor 110, a memory 112, and a communications interface 114, a sensor system 116, and a external device 118. In other embodiments, system 100 may include additional, fewer, or alternative components, including those described elsewhere herein. In the example embodiment, blower system 100 is configured to generate at least two calibration points used to calibrate motor 106.

Blower 104 is configured to generate an airflow 120 directed through duct 102. In at least some embodiments, blower 104 is a forward-curved centrifugal blower. In other embodiments, blower 104 is a different type of blower or fan, such as a radial backward-curved blower, or an axial or vane-axial fan. Duct 102 is configured to guide the airflow for circulation and distribution within, for example, a building, vehicle, or other structure. Duct 102 defines an airflow restriction that affects the airflow output from blower 104. The airflow restriction is based on various parameters that may affect airflow within system 100, such as, but not limited to, the internal dimensions of duct 102, open or closed dampers, contaminants (e.g., dust) within duct 102, the geometry of duct 102, and the like.

In order to determine a first calibration point, for example, a first airflow restriction in duct 102 is used. To determine a second calibration point, a second airflow restriction in duct 102 is used (e.g., by closing and/or opening a damper). To determine further calibration points, further airflow restrictions in duct 102 may be used. Notably, duct 102 can be used in its normal operating environment (i.e., field) during the calibration process described herein.

Motor 106 is configured to drive blower 104 to generate the airflow into duct 102. In at least some embodiments, motor 106 is an electric motor configured to convert electrical power into mechanical power. In one example, motor 106 is coupled to a wheel (not shown) of blower 104 and is configured to rotate the wheel.

In the exemplary embodiment, motor 106 is configured to operate at a plurality of torque output levels to increase or decrease a corresponding motor speed (i.e., torque-controlled). In other embodiments, motor 106 is configured to operate at a plurality of speeds to increase or decrease a corresponding motor torque (i.e., speed-controlled). Increasing or decreasing the speed and/or torque of motor 106 causes motor 106 to drive blower 104 to generate corresponding airflows. The airflow generated by blower 104 is at least partially a function of the motor speed of motor 106 and the airflow restriction of duct 102. In some embodiments, motor 106 is integrated with blower 104.

Motor controller 108 is communicatively coupled to motor 106 to operate motor 106. More specifically, motor controller 108 transmits control signals to motor 106 to operate motor 106. In the example embodiment, by adjusting the control signals, motor controller 108 is configured to control the torque of motor 106, thereby facilitating control of the speed of motor 106. In other embodiments, motor controller 108 may be communicatively coupled to another controller (e.g., external device 118) associated with motor 106. In such embodiments, motor controller 108 may be configured to allow the other motor controller to operate motor 106. In the exemplary embodiment, motor controller 108 is separate from motor 106. In one example, motor controller 108 is within a unit (not shown) that may include blower 104 and/or motor 106 for installation within duct 102. In another example, motor controller 108 is an external controller, such as a thermostat system or a system controller coupled to blower system 100. Alternatively, motor controller 108 may be integrated with motor 106.

In the exemplary embodiment, motor controller 108 includes processor 110, memory 112 communicatively coupled to processor 110, and communications interface 114. Motor controller 108 is also communicatively coupled to sensor system 116. Processor 110 is configured to execute instructions stored within memory 112 to cause motor controller 108 to function as described herein. Moreover, memory 112 is configured to store data to facilitate calibrating motor 106. In some embodiments, motor controller 108 may include a plurality of processors 110 and/or memories 112. In other embodiments, memory 112 may be integrated with processor 110. In one example, memory 112 includes a plurality of data storage devices to store instructions and data as described herein. Communications interface 114 may include one or more wired or wireless hardware interface such as, for example, universal serial bus (USB), RS232 or other serial bus, CAN bus, Ethernet, near field communication (NFC), WiFi, Bluetooth, or any other suitable digital or analog interface for establishing one or more communication channels. The established communication channels may include, for example, channels between motor controller 108 and external device 118. Communications interface 114 further includes a software or firmware interface for receiving one or more motor control parameters and writing them, for example, to memory 112. In certain embodiments, communication interface 114 includes, for example, a software application programming interface (API) or command set for supplying one or more coefficient values for a constant airflow algorithm. In such embodiments, values (e.g., torque, speed, and/or airflow values) are stored in memory 112 along with at least one constant airflow algorithm for subsequent execution by processor 110 during operation of motor 106.

Sensor system 116 includes one or more sensors configured to monitor motor 106 and/or duct 102. Sensor system 116 may monitor airflow in duct 102. In some embodiments sensor system 116 may monitor data associated with motor 106, such as, but not limited to, motor speed, torque, power, and the like. Airflow may also be calculated based on different measurements such as, as examples, air velocity, pressure drop across a calibrated nozzle, temperature change, humidity change, and air density change. In some embodiments, sensor system 116, and other sensor systems described herein, may include more than one sensor. In certain embodiments, sensor system 116 is configured to monitor an airflow output of blower 104. In some embodiments, sensor system 116 monitors motor 106 from motor controller 108. In such embodiments, sensor system 116 may be integrated with processor 110. In other embodiments, at least some sensors of sensor system 116 may be installed on motor 106 and transmit sensor data back to motor controller 108.

External device 118 may be a user computing device (e.g., a smartphone, laptop, tablet, etc.) that may be configured to be in communication with motor controller 108. For example, external device 118 may be configured to transmit a desired torque, speed, and/or airflow to motor controller 108. External device 118 may also be configured to receive, from motor controller 108, torque, speed, and/or airflow data regarding blower system 100. In some embodiments external device 118 may be a controller other than motor controller 108. As examples, external device 118 may be a system controller for an HVAC system or a smart thermostat.

In the exemplary embodiment, as described herein, a calibration process is performed at least partially by motor controller 108 to calibrate motor 106. During the calibration process, motor controller 108 is configured to operate motor 106 at a first torque and a first speed to generate a first airflow. In some embodiments, the first torque, speed, and/or airflow values may be received at motor controller 108 from external device 118 as inputs. In the example embodiment, motor controller 108 receives and operates motor 106 at a first torque value received from external device 118 (e.g., 50% torque, or any percentage of maximum torque for motor 106). Motor 106 operates at the first torque, causing motor 106 to operate at a first speed. Motor 106 operates at the first torque and first speed, while duct 102 has a first system resistance, thereby generating a first airflow in duct 102 as measured by sensor system 116. The example embodiment of the calibration process described herein uses a minimum of at least one speed, torque, and airflow value in memory 112 (stored as, for example, a benchmark data point) when duct 102 has a first system resistance. From the first speed, first torque, and first airflow, a first airflow-to-speed ratio is defined for system 100 having the first system resistance. The first airflow-to-speed ratio, known to be constant on a first system line corresponding to the first system resistance, is then used by motor controller 108 along with the first benchmark data point in, for example, a regression analysis used to generate a plurality of torque-speed-airflow points defining the first system line. In some embodiments, more than one torque-speed-airflow point may be measured at the first system resistance prior to the regression analysis, demonstrating flexibility of the systems and methods described herein. For example, while only one torque-speed-airflow point is needed before the regression analysis is performed, the resulting system line may be a more accurate representation of system 100 at the first resistance if more than one torque-speed-airflow point is measured prior to the regression analysis.

In the example embodiment, the first system resistance is then changed to a second system resistance. Notably, this is the only change made, and the change may be as simple as adjusting a nozzle or damper in duct 102, and does not require the sophisticated equipment currently used for calibrating motors. This change in system resistance can even be made "in the field," and does not need to be performed before system 100 is installed (i.e., not in a laboratory for calibrating motor 106 before motor 106 and motor controller 108 are installed in the field).

After the first system resistance is changed to the second system resistance, motor controller 108 is configured to operate motor 106 at a second speed. In the example embodiment, torque is kept approximately constant during the change from the first system resistance to the second system resistance. In some embodiments, torque may not be kept constant. A second airflow is then measured at duct 102 to define a second airflow value. The second speed, second airflow, and second torque, which may be the same as the first torque, define a second airflow-to-speed ratio and a second benchmark data point for system 100 having the second system resistance. This second airflow-to-speed ratio is then stored in memory 112, and is used by processor 110, along with the second benchmark data point, to generate a second plurality of torque-speed-airflow points defining a second system line.

In some embodiments, the first and second system lines may be expanded by processor 110 to generate a constant airflow profile, or operating profile, for system 100, defining a plurality of system lines representing varying system resistances. For example, as explained above, at least two torque-speed-airflow data points are defined for the constant airflow system. In torque-controlled embodiments, the operating profile is then determined by approximating a polynomial, airflow algorithm, or formula, that defines motor torque (T) as a function of motor speed (N) and airflow rate demand (Q). This profile may be used by processor 110 to generate constants for constant airflow equations.

In some embodiments, processor 110 utilizes at least one constant airflow equation, with constants as defined during the calibration process as described above, to determine a torque or speed required for the resistance of duct 102 to keep a first airflow in duct 102 substantially constant. Upon detecting a change in torque or speed of motor 106, motor controller 108 is configured to generate a new setpoint from the at least one constant airflow equation, using the changed torque or speed values, to determine a new torque or speed required to again generate the first airflow. Motor controller 108 then commands motor 106, based on the outcome of the constant airflow equation, such that the first airflow is again produced in duct 102.

In at least some embodiments, motor controller 108 is configured to initiate the calibration process in response to a command requesting calibration of motor 106. In other embodiments, motor controller 108 may be configured to determine whether motor 106 is calibrated and automatically begins the calibration process when motor controller 108 determines motor 106 is out of calibration.

Figure 2:
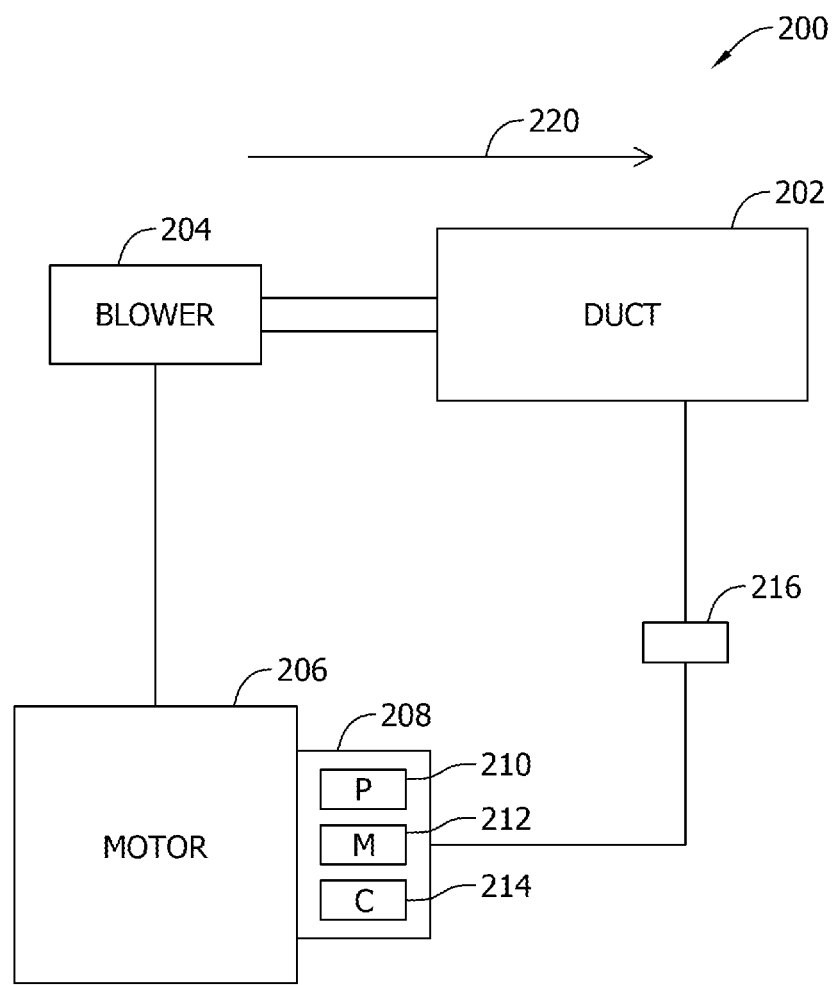
FIG. 2 shows a block diagram of an exemplary blower system in the field.

FIG. 2 shows a block diagram of a blower system 200 in the field. In the example embodiment, blower system 200, and components of blower system 200 are consistent with blower system 100 and are configured to be substantially similar to each other. Blower system 200 includes a duct 202, a blower 204, a motor 206, a motor controller 208, including a processor 210, a memory 212, a communications interface 214, and a sensor system 216. In some embodiments, sensor system 216 is configured to make measurements other than airflow measurements. In some embodiments, the components of blower system 200 may be different from the components of blower system 100.

Blower system 200 represents a block diagram of blower system 200 after a two point characterization/calibration process has been performed, as was described above. In other words, blower system 200 represents a blower system that has already been calibrated, and at least two airflow-to-speed ratios are stored in memory 212. However, in the example embodiment shown in FIG. 2, no constant airflow equations or profiles have been determined or calibrated as described above. Rather, based on the at least two airflow-to-speed ratios, blower system 200 is configured to dynamically operate at a constant airflow without the use of constant airflow algorithms as described above.

To operate at a constant airflow, motor controller 208 is configured to operate motor 206 at a first torque-speed-airflow point consistent with one of the at least two airflow-to-speed ratios. In other embodiments, only a current airflow-to-speed ratio is known, and the first torque is approximated by a polynomial function of speed. Accordingly, the first torque, airflow, and speed are all known by motor controller 208. Motor controller 208 is further configured to detect a change in speed or torque, indicating a change in resistance and airflow, thus requiring a further change in speed or torque in order to produce the first airflow.

For example, motor controller 208 may detect a change in speed. The new speed ($N_{curr}$) is measured by motor controller 208 or sensor system 216. In this embodiment, torque has remained approximately the same. An airflow (Q) to speed (N) equation is stored in memory 212 and used by processor 210 to determine a current airflow ($Q_{curr}$) when torque is kept constant:

$$Q_{curr} = C_1 \times N_{curr} + C_2$$

where $C_1$ and $C_2$ are known constants, stored in memory 212. $C_1$ and $C_2$ may be determined when torque is kept constant by, for example, solving the above equation with different Q and N values, and solving two of those equations for the two unknowns ($C_1$ and $C_2$). Current speed of motor 206 ($N_{curr}$) and the constants ($C_1$ and $C_2$) are known, and processor 210 determines a current airflow produced by motor 206 ($Q_{curr}$) Different equations may be used in some embodiments, for example speed-controlled embodiments. To keep airflow constant, motor controller 108 is configured to determine a new speed at which to operate motor 206 in order to generate the first airflow, but with a second system resistance (e.g., caused by a change in duct 202). An airflow-to-speed ratio is constant for a system with the same resistance, as described above. Therefore, the airflow-to-speed ratio for system 200 when system 200 has a second resistance is constant. Accordingly, the desired airflow ($Q_{des}$) is the same as the first airflow, and processor 210 is configured to determine a desired speed ($N_{des}$), for example by using the following equation stored in memory 212:

$$Q_{curr}/N_{curr} = Q_{des}/N_{des}$$

or, as re-written:

$$N_{des} = Q_{des}/(Q_{curr}/N_{curr})$$

where $Q_{des}$, $Q_{curr}$, and $N_{curr}$ are all known as described above. Accordingly, processor 210 of motor controller 208 is configured to operate motor 206 at $N_{des}$ such that the first airflow (i.e., $Q_{des}$) is again produced in duct 202.

In some embodiments, a $T_{des}$ may be used by motor controller 208 to operate motor 206. In these embodiments, $T_{des}$ may be approximated by a polynomial function of $N_{des}$, upon determining $N_{des}$ as described above. Upon determining $T_{des}$, motor controller 208 is configured to operate motor 206 at $T_{des}$ to produce the first airflow (i.e., $Q_{des}$) in duct 202.

In some embodiments, rather than detecting a change in speed, a change in torque may be detected by motor controller 208. In these embodiments, a similar process as the process described above is executed by processor 210 to determine a desired torque $T_{des}$. For example, a desired torque ($T_{des}$) may be determined by the following equation:

$$T_{des} = T_{curr} * (Q_{des}/Q_{curr})^2$$

Motor controller 208 is then configured to operate motor 206 at $T_{des}$ such that the first airflow is produced in duct 202. Also similar to the process described above, a desired speed $N_{des}$ may be used by motor controller 208 to operate motor 206. Thus, upon determining $T_{des}$, a further step may be taken by processor 210 to determine $N_{des}$. Motor controller 208 is configured to then command motor 206 to operate at $N_{des}$, such that the first airflow (i.e., $Q_{des}$) is produced in duct 202.

In some embodiments, motor controller 208 may be configured to change speed (e.g., from $N_{curr}$ to $N_{des}$) or torque (e.g., $T_{curr}$ to $T_{des}$) at rates less than a predetermined threshold for speed change or torque change. For example, changing speed or torque of motor 206 too quickly could cause problems with motor 206 and the rest of blower system 200. Accordingly, predetermined threshold values for torque change and speed change may be stored in memory 212 and accessible by processor 210 such that when motor controller 208 commands changes in speed or torque of motor 206, motor controller 208 commands motor 206 to change speed or torque at a rate of change less than a predetermined threshold for speed change or torque change.

In some embodiments, motor controller 208 may be configured to allow minor changes in torque or speed before changing the operating speed or torque of the motor. For example, predetermined thresholds for speed or torque may be stored in memory 212 and accessible by processor 210 such that minor changes during operation of motor 206 that do not meet the predetermined thresholds for speed or torque change and do not indicate a significant enough change to initiate the described processes above with respect to FIG. 2.

Figure 3:
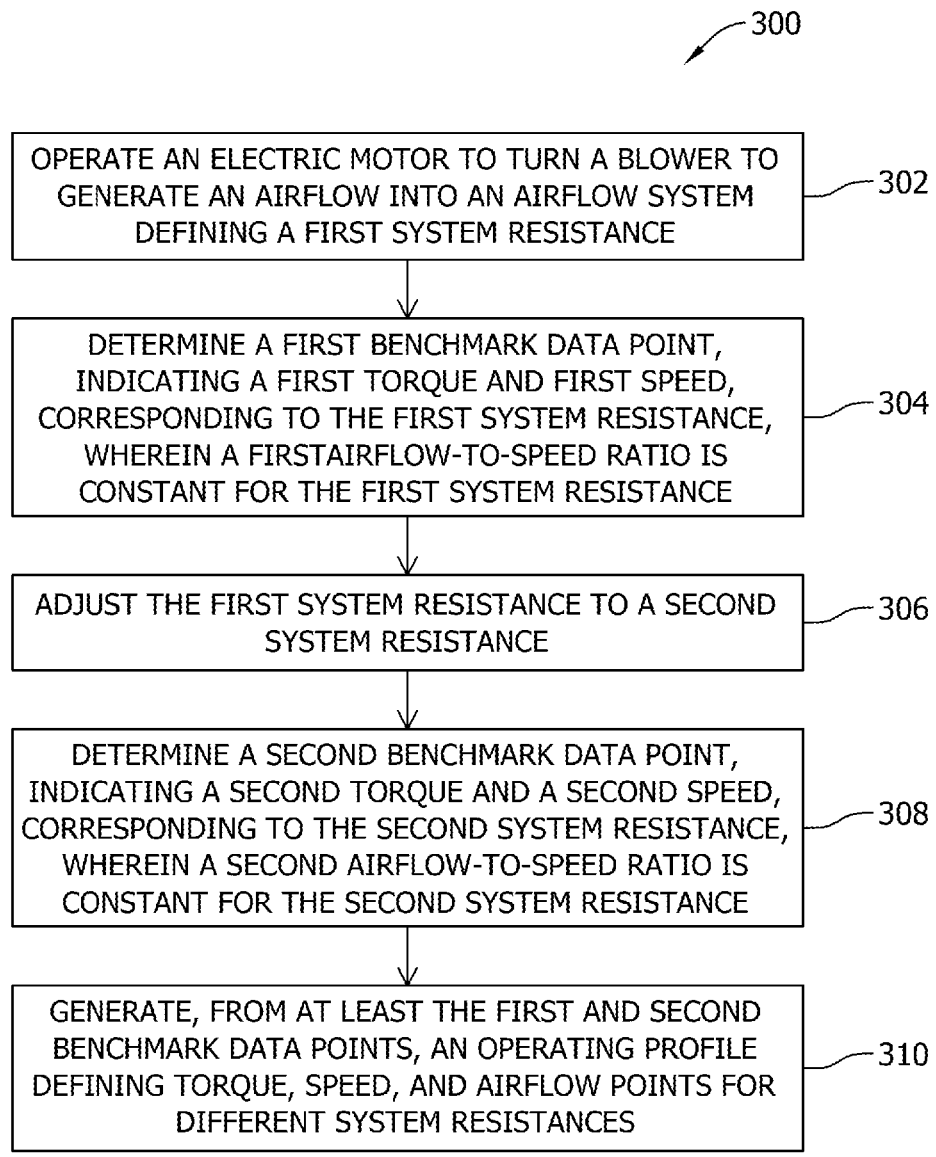
FIG. 3 is a flow diagram of an example method illustrating characterization/calibration of a motor for use in the blower systems shown in FIGS. 1 and 2.

FIG. 3 is a flow diagram of an example method 300 illustrating characterization/calibration of a motor, such as motor 106, in accordance with the present disclosure. Method 300 includes operating 302 electric motor 106 to turn blower 104 to generate airflow 120 into duct 102 of an airflow system, defining a first system resistance. A first benchmark data point is determined 304, indicating a first torque and first speed, corresponding to the first system resistance. A first airflow-to-speed ratio is constant for the first system resistance. The first system resistance is adjusted 306 to a second system resistance, where a second benchmark data point is determined 308, indicating a second torque and a second speed, corresponding to the second system resistance. A second airflow-to-speed ratio is constant for the second system resistance. An operating profile is then generated 310 based at least on the first and second benchmark data points. In some embodiments, method 300 includes generating the operating profile at torques other than the first torque and the second torque. In some embodiments, the operating profile is stored in memory 112.

In some embodiments, method 300 also includes transmitting, to external device 118 or memory 112, the operating profile. In some embodiments, method 300 includes receiving, from a user computing device including a user interface, the first torque or the first speed. In some embodiments of method 300, the first torque and the second torque are the same, while in other embodiments of method 300 the first torque and the second torque are different.

Figure 4:
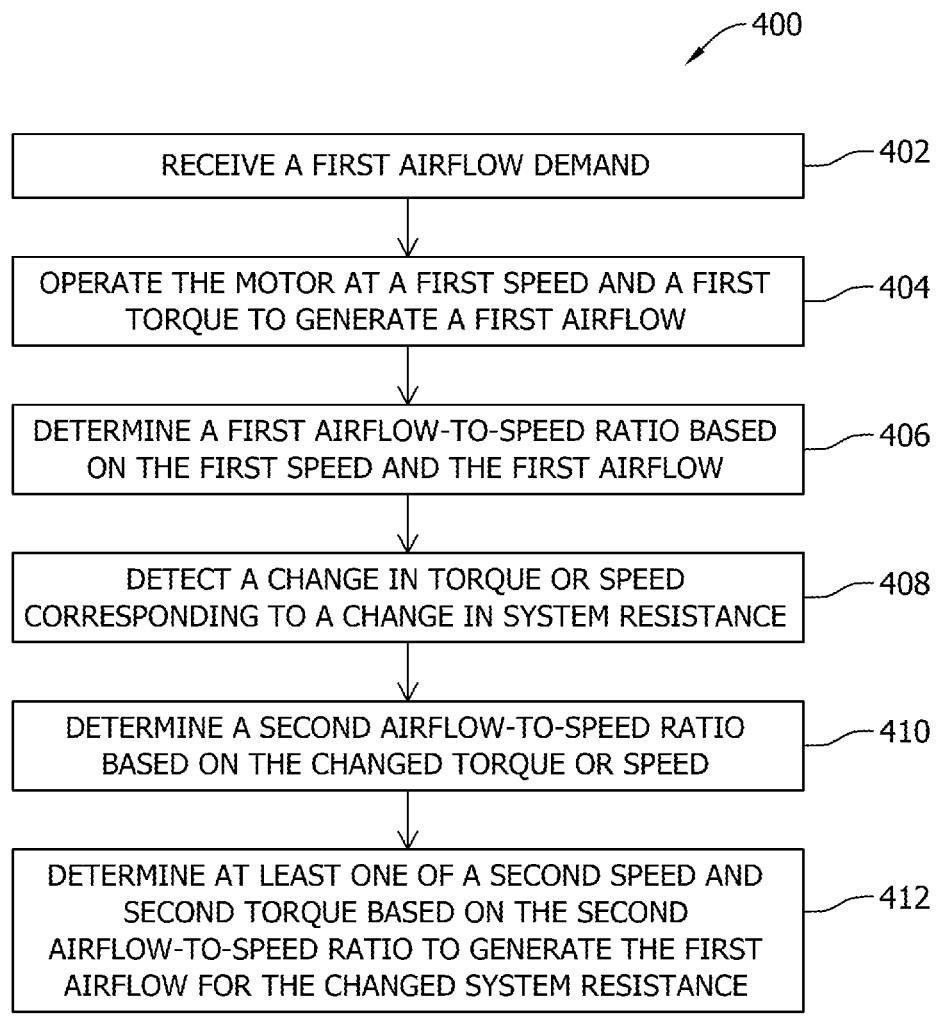
FIG. 4 is a flow diagram of an example method of operating a motor in a constant airflow mode.

FIG. 4 is a flow diagram of an example method 400 of operating motor 206 in a constant airflow mode in accordance with the present disclosure. A first airflow demand is received 402 and motor 206 is operated 404 at a first speed and a first torque to generate a first airflow. A first airflow-to-speed ratio is determined 406 based on the first speed and the first airflow. A change in torque or speed, corresponding to a change in system resistance, is detected 408 and a second airflow-to-speed ratio is determined 410 based on the changed torque or speed. At least one of a second speed and second torque is determined 412 based on the second airflow-to-speed ratio to generate the first airflow for the changed system resistance.

In some embodiments, method 400 includes determining a second airflow-to-speed ratio when the change in torque or speed is greater than a respective torque predetermined threshold or speed predetermined threshold. In some embodiments, method 400 includes adjusting the speed of the motor such that the speed of the motor changes at a rate less than a speed-change predetermined threshold until the speed of the motor is the second speed. In some embodiments, method 400 includes adjusting the torque of the motor such that the torque of the motor changes at a rate less than a torque-change predetermined threshold until the torque of the motor is the second torque. In some embodiments, method 400 includes allowing minor changes in the speed of the motor before determining the second airflow-to-speed ratio or allowing minor changes in the torque of the motor before determining the second airflow-to speed ratio.

The systems and methods described herein may be implemented using computer programming or engineering techniques including computer software, firmware, hardware or any combination or subset thereof, wherein the technical effect may include at least one of: (a) removing the need for sophisticated laboratory equipment to calibrate a motor; (b) reducing the minimum number of necessary calibration points to two; (c) reducing the time of calibration, thereby reducing the effect of calibration on operation of the motor; and (d) improving operation of a motor in a constant airflow mode.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric blower system, comprising:
   a blower;
   an airflow system defining a variable system resistance;
   a sensor coupled to said airflow system and configured to measure an airflow through said airflow system;
   an electric motor coupled to said blower and configured to turn said blower to generate the airflow through said airflow system, said electric motor including:
   a motor controller configured to:
      operate said motor at a first torque and a first speed to generate a first airflow;
      determine, based on measurements received from said sensor, a first airflow value corresponding to the first speed and the first torque of said electric motor and a first system resistance, wherein the first airflow value, the first torque, and the first speed define a first benchmark data point;
      operate said motor at a second torque and a second speed to generate a second airflow;
      determine, based on measurements received from said sensor, a second airflow value corresponding to the second speed and the second torque of said electric motor and a second system resistance, wherein the second airflow value, the second torque, and the second speed define a second benchmark data point; and
      generate, from at least the first and second benchmark data points, an operating profile for said electric blower system defining torque, speed, and airflow points for different system resistances, wherein the operating profile is generated based on a first ratio of the first speed to the first airflow and a second ratio of the second speed to the second airflow.

2. The system of claim 1, wherein said motor controller is further configured to store the operating profile in a memory.

3. The system of claim 1, wherein said motor controller is configured to generate the operating profile at torques other than the first torque and the second torque, and speeds other than the first and second speeds.

4. The system of claim 1, wherein said motor controller is further configured to generate a first plurality of data points corresponding to the first system resistance, and a second plurality of data points corresponding to the second system resistance.

5. The system of claim 1, wherein the first torque and the second torque are different.

6. The system of claim 1, wherein the first torque and the second torque are the same.

7. The system of claim 1, wherein said motor controller is further configured to generate, from no more than the first and second benchmark data points, the operating profile.

* * * * *